Figure 1:
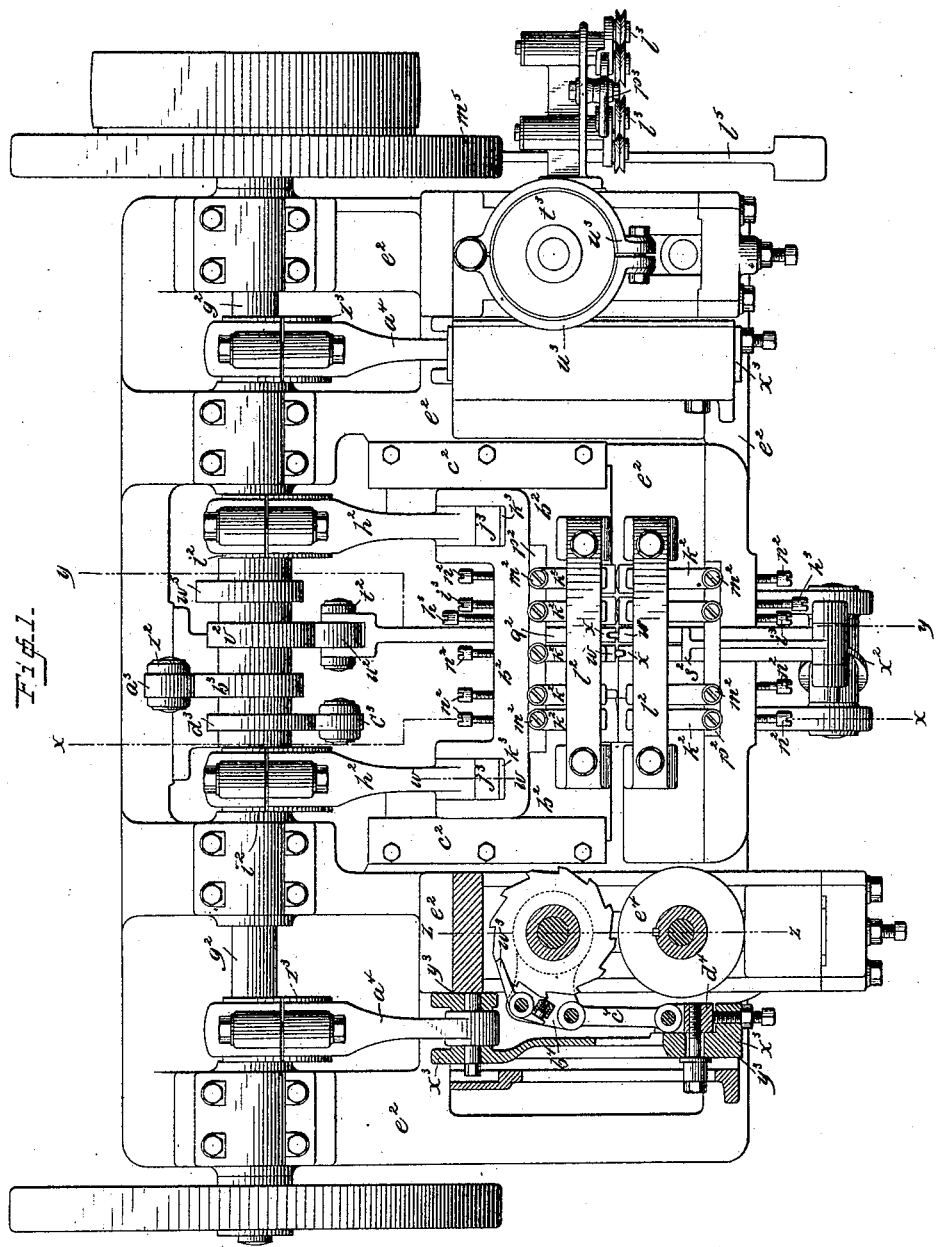

(No Model.) 6 Sheets—Sheet 1.
E. JORDAN & J. H. TEMPLIN.
MACHINE FOR MAKING BARBED FENCING.

No. 390,975. Patented Oct. 9, 1888.

Witnesses:
E. C. Perkins.
W. H. Morgan.

Inventor:
Edmund Jordan,
Jos. H. Templin,
By A. P. Thayer,
Atty.

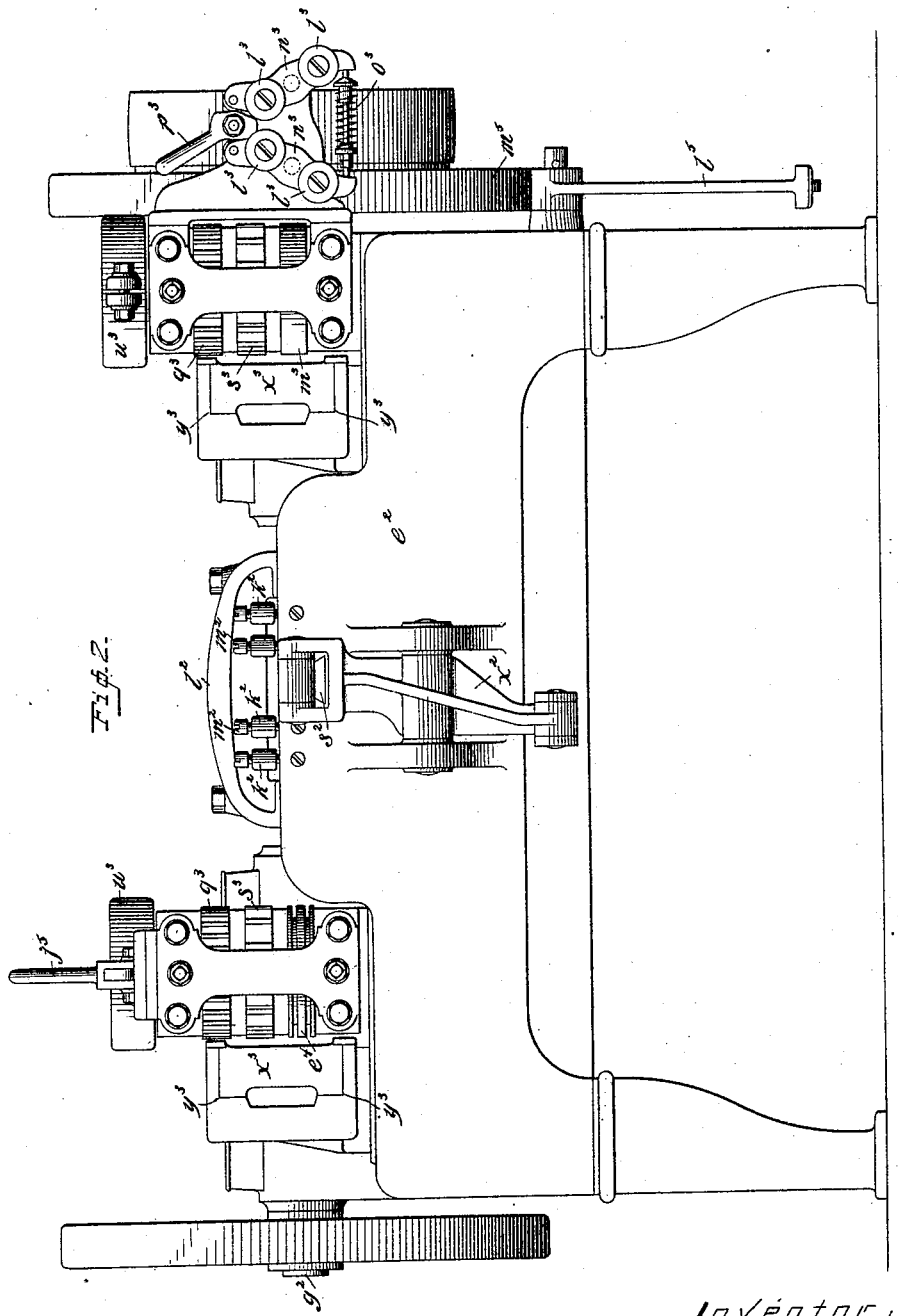

(No Model.) 6 Sheets—Sheet 3.
E. JORDAN & J. H. TEMPLIN.
MACHINE FOR MAKING BARBED FENCING.
No. 390,975. Patented Oct. 9, 1888.
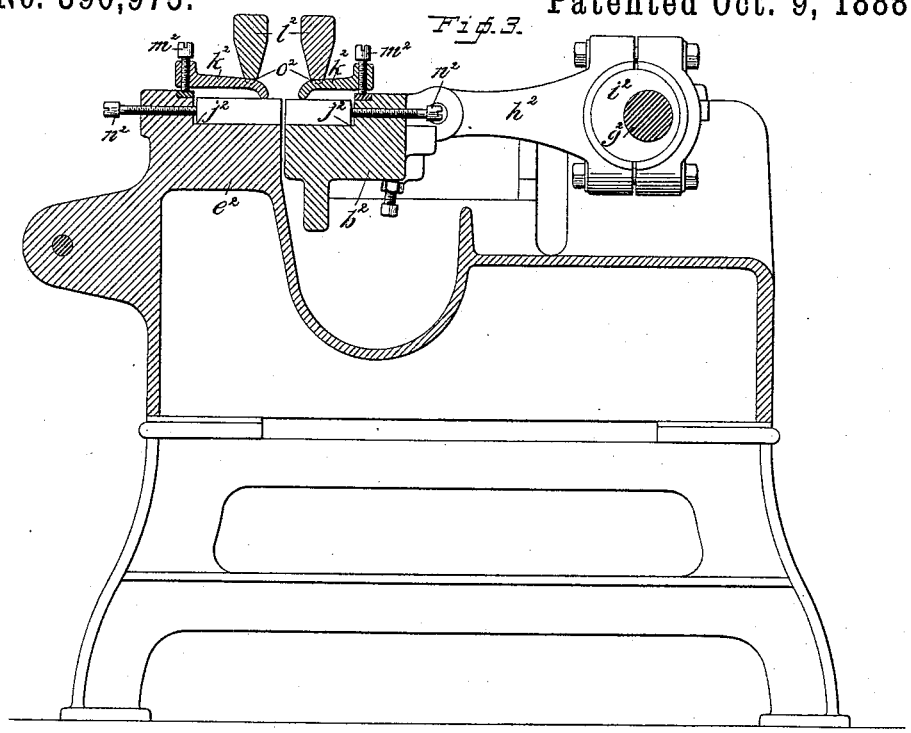
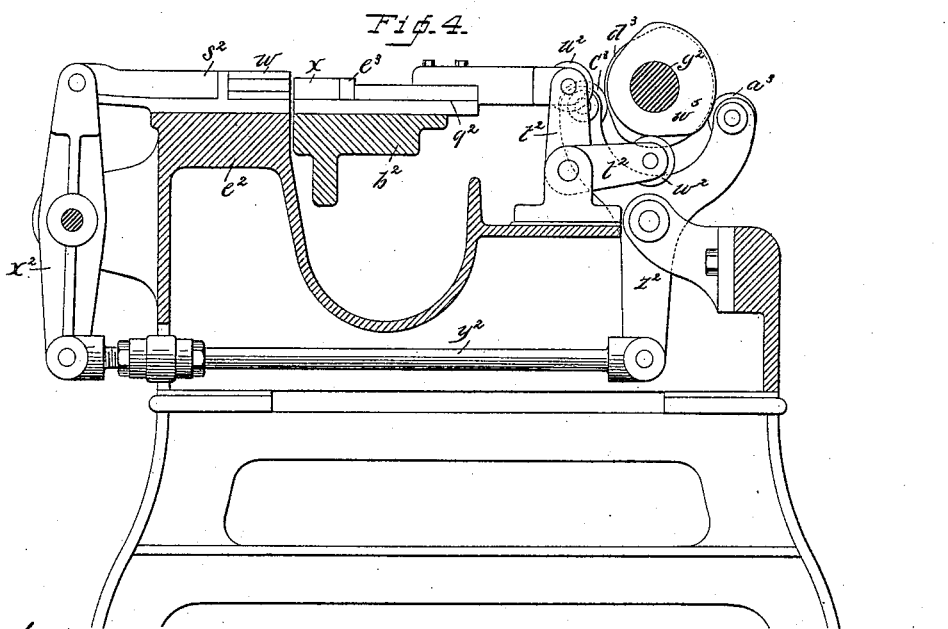
Witnesses: E. O. Perkins, D. H. Morgan.
Inventor: Edmund Jordan, Jos. H. Templin, By A. P. Thayer, atty.
N. PETERS, Photo-Lithographer, Washington, D. C.

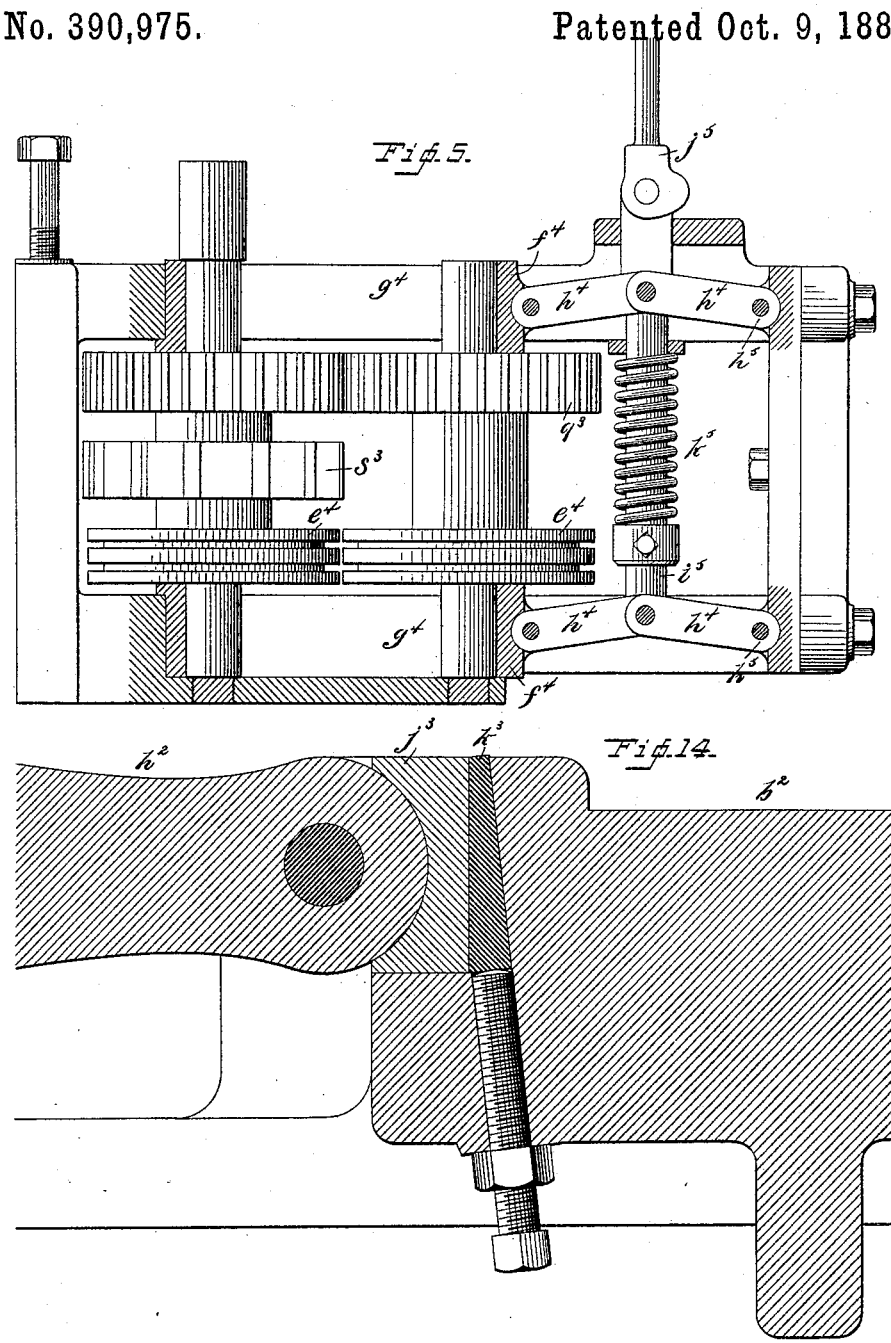

(No Model.) 6 Sheets—Sheet 5.
E. JORDAN & J. H. TEMPLIN.
MACHINE FOR MAKING BARBED FENCING.
No. 390,975. Patented Oct. 9, 1888.
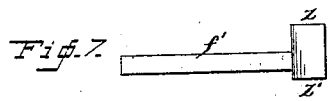
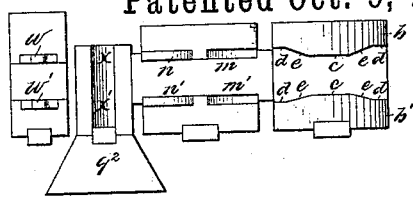
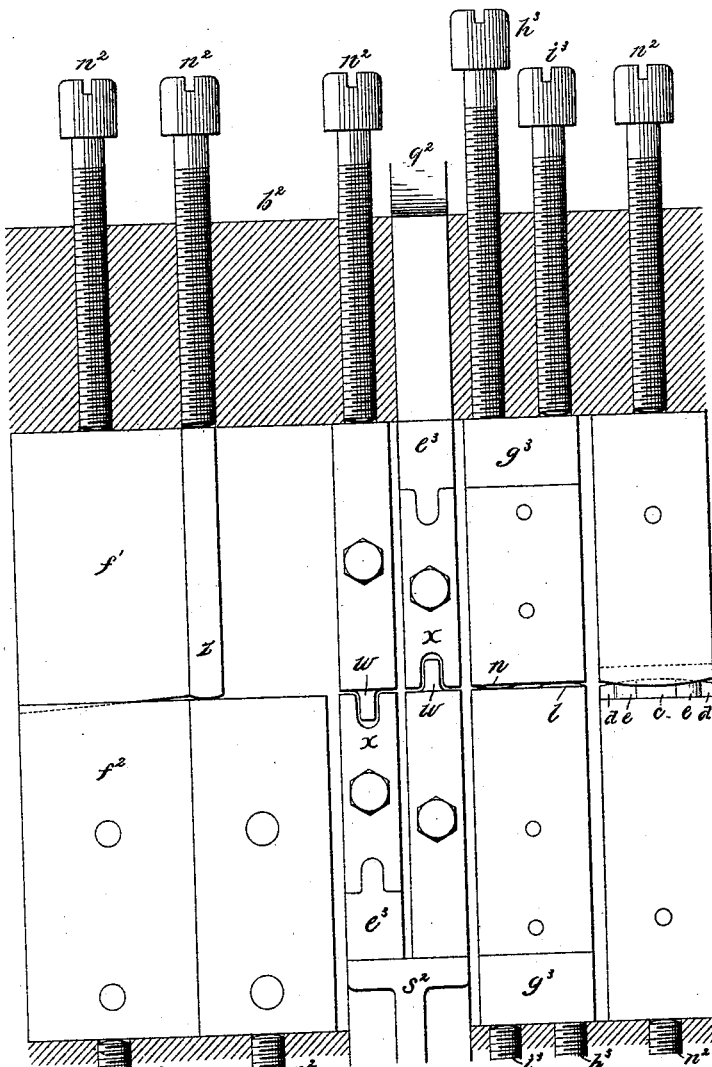
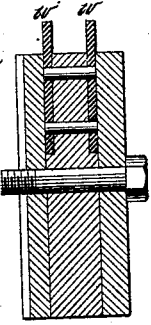
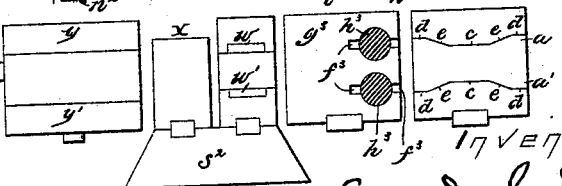

(No Model.) 6 Sheets—Sheet 6.
E. JORDAN & J. H. TEMPLIN.
MACHINE FOR MAKING BARBED FENCING.
No. 390,975. Patented Oct. 9, 1888.
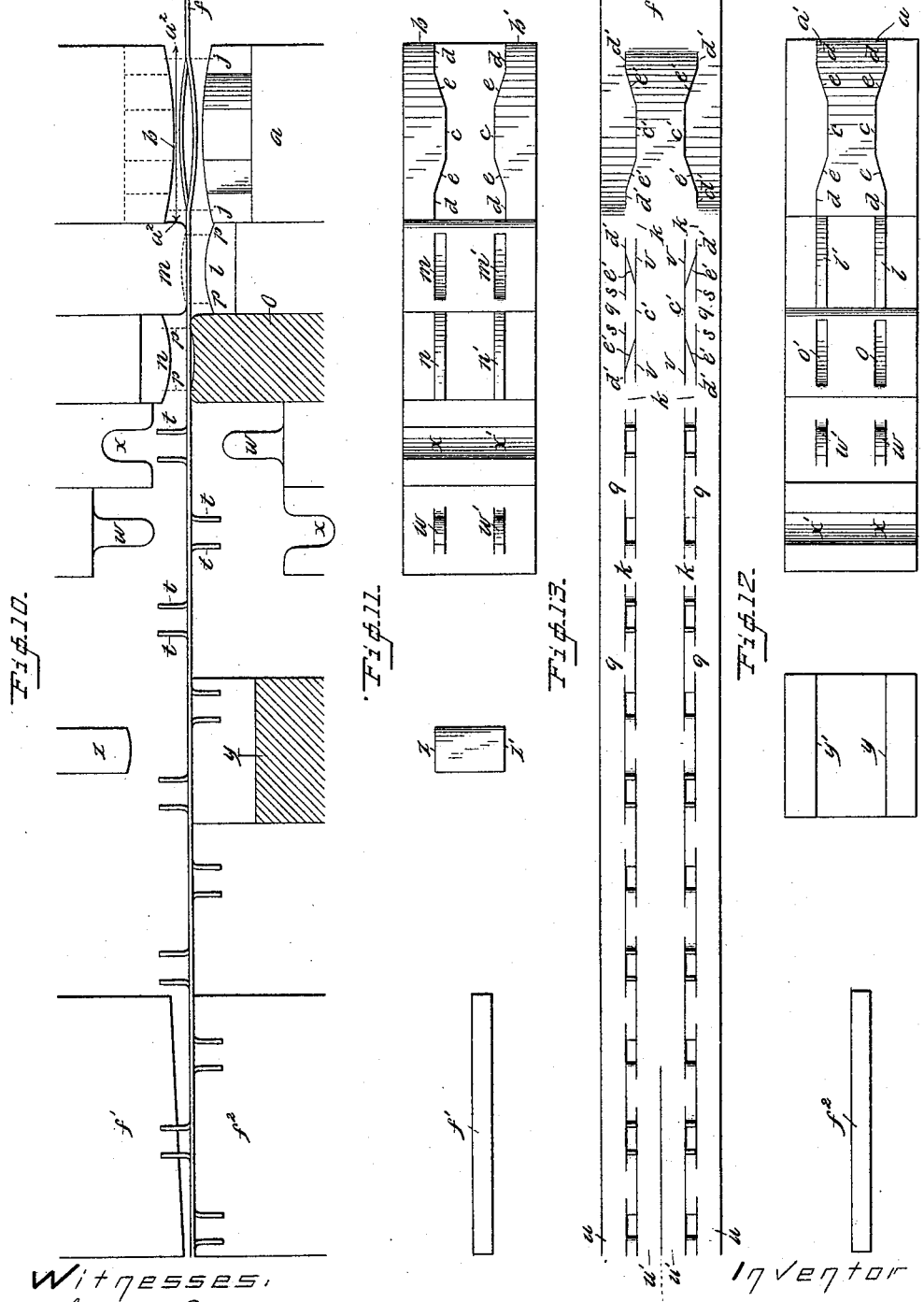

UNITED STATES PATENT OFFICE.

EDMUND JORDAN AND JOSEPH H. TEMPLIN, OF BROOKLYN, NEW YORK, ASSIGNORS TO MICHAEL H. CASHMAN, OF SAME PLACE.

MACHINE FOR MAKING BARBED FENCING.

SPECIFICATION forming part of Letters Patent No. 390,975, dated October 9, 1888.

Application filed September 17, 1886. Serial No. 213,800. (No model.)

*To all whom it may concern:*

Be it known that we, EDMUND JORDAN and JOSEPH H. TEMPLIN, citizens of the United States, residing at Brooklyn, in the county of Kings and State of New York, have invented new and useful Improvements in Machines for Making Barbed Fencing, of which the following is a specification.

This invention consists of the hereinafter-described improvements in construction and organization of mechanism for operating the cutting and barbing devices invented by Edmund Jordan, and described in two applications for patents filed by him February 18, 1886, Serial Nos. 192,343 and 192,344; and it also consists of improvements in feeding mechanism therefor, all as hereinafter fully described, reference being made to the accompanying drawings, in which—

Figure 1 is a plan view of the improved machine with some of the parts in horizontal section. Fig. 2 is a front elevation. Fig. 3 is a transverse section on line $x\,x$, Fig. 1. Fig. 4 is a transverse section on line $y\,y$ of Fig. 1. Fig. 5 is a detail of some of the feed mechanism in section on line $z\,z$ of Fig. 1, and on an enlarged scale. Fig. 6 is a plan of the cutting and barbing devices as when closed on the strip with some of the holding and adjusting mechanism, part of which is in horizontal section. Fig. 7 is a face view of the working, cutting, and barbing devices, and of a slide carrying one of the barb-bending dies. Fig. 8 is a rear view of the opposing, cutting, and barbing devices, and of a slide carrying some of said devices which are movable. Fig. 9 is a detail of some of the bending-dies in section. Fig. 10 is a plan, with parts in section, of the cutting and barbing devices in the open position with a strip between them, illustrating the operation of the barbing devices. Figs. 11 and 12 are face views of the working and stationary dies, respectively. Fig. 13 is a diagram of a portion of a blank strip to be barbed, showing the making of four barbed strips from one wide blank strip; and Fig. 14 is a detail in section on line $w\,w$, Fig. 1.

Referring, in the first place, to Figs. 10, 11, 12, and 13 for the proper understanding of the barbing mechanism and mode of operation of the same invented by the said Jordan, the said devices consist of a pair of shearing-dies, $a\,b$, with oval or convex faces, as represented in Fig. 10, and having the cutting-edges $c$ along the middle portion, and $d$ near each end in different parallel planes, and diagonal edges $e$, connecting the ends of the parts $c\,d$, respectively, the length of the whole of the cutting-edge—that is, from end to end of the dies—being equal to the distance the barbs to be produced are desired to be apart from center to center along the completed strips, and the distance of the planes of edges $c\,d$ apart is equal to the width of the barbs. These dies make the first operation in the process of slitting and barbing two strips from one blank, and they are duplicated at $a'$ and $b'$, together with other following-described duplicates for converting a wider blank strip into four barbed strips at once, the duplicates being located side by side a suitable distance apart for so cutting the wide blank $f$ that said blank being subsequently slitted along the middle will develop in four barbed strips. With these dies the slits $c'$, $d'$, and $e'$ are first cut through the strip, extending from one to the other of the dotted lines $j$, Fig. 10, the strip being fed a distance equal to the full length of the dies, or thereabout, at each operation —that is, from $a^2$ to $a^2$—which leaves the intervals of uncut webs $k$ between the ends of the slits. Next following the first slitting-dies are the male and female parallel-edged barb-cutting dies $l\,m$, cutting on one side of the strip, and similar dies, $n\,o$, cutting on the other side, together being equal in length to the first dies and like them cutting a little less than the full length, as indicated by the dotted lines $p$, so as not to extend beyond the ends of the first cuts, and still to leave the uncut webs $K$ at the ends of the said first long slits made by the first dies, and also to leave the uncut webs $q$ between the cuts $s$, which they make on one side of the barbs $t$, to partly sever them from the barb-strips $u$, to which they remain attached at the base. They also make the cuts $v$ along the other side of the barbs of the other barb-strips, $u'$, leaving said barbs connected at their base to the strip to which they belong.

The dies $m$ and $o$ consist of grooves of the width of the barbs in a flat face, while the dies $l\,m$ are corresponding oval-faced ribs on suitable movable stocks. These two pairs of dies complete the cutting of two barbs on each barb-strip to each long slit made by the first pair of dies, and partly bend them into the required lateral projection, which is perpendicular to the plane of the strip and alternately in opposite directions. After the operation of these second cutting-dies, the strip thus completely cut for the barbs proceeds to the two pairs of male and female bending-dies $w$ $x$, suitably placed in the train for bending one pair of the cut barbs one way and the other pair reversely, which completes the cutting and bending of the barbs, leaving each two barbed strips joined by the webs $k$, which next rest between the bed-dies $y$ and movable dies $z$, suitably located in the train to sever said webs. Then, when the duplicate cutters $l'$ $m'$ and $n'$ $o'$, duplicate benders $w'$ $x'$, and web-cutters $y'$ $z'$ are used, together with the duplicate primary cutters $a'$ and $b'$, as here shown, the strip proceeds to the shears $f'$ $f^2$, which cut apart the middle web along its middle at $g$ between the two barbed strips of each side of said middle web, and thus complete the process of producing the four barb strips from one blank. Both of the dies of each pair of the benders are movable and have sufficient range to clear the points of the bent barbs and allow them to pass freely, and the cutters $b$, $m$, $n$, $z$, and $f'$ are also movable. Said cutters and the benders $w$ of the same range are mounted in the slide $b^2$, working in the ways $c^2$ of the bed-plate $e^2$, and connected with the driving-shaft $g^2$ by the rods $h^2$ and eccentrics $i^2$ for being operated.

The opposite range of cutters $a$, $l$, $o$, $y$, and $f^2$ are arranged in fixed positions in the bed, and these and all the cutters and benders mounted on the slide $b^2$ are detachably secured for ready removal, when required for grinding or repairs, by being clamped in bed recesses or grooves $j^2$, with the clamp-levers $k^2$, fulcrum-bars $l^2$, and the binding-screws $m^2$. They also have adjusting-screws $n^2$ behind them for setting them forward. The fulcrum-bars $l^2$ are strong iron beams attached to the slide and bed-plate, respectively, at the ends of the bars, and adapted to extend along over the stocks of the cutters a little above them, and being notched at $o^2$ in the lower side to seat the fulcrum-levers, so as to retain them against displacement laterally. The points of the binding-screws $m^2$ are hardened, and they are seated in hardened-steel plates $p^2$, suitably bedded in the slide and bed-plate, respectively.

The benders $x$ on the side of the movable range of cutters are attached to an independent slide, $q^2$, adjusted in ways in the slide $b^2$ to move said benders up against the side of the strip $f$ in advance of the rest of the movable dies, and both the benders $x$ and $w$ on the side of the stationary range of cutters are attached to an independent slide, $s^2$, having ways in the bed-plate and adapted to move them forward next after the advance of the benders on slide $q^2$, the object being to engage and secure the strip somewhat fixedly by the first pair of benders, $w$ $x$, for staying it as firmly as may be in advance of the action of the cutters, and thereby secure more accurate effect of the cutters than would be the case if all the movable dies, including the benders, were made to operate in unison, as the range of the strip along the dies is so long from one point of its support to the other that it is liable to spring and vibrate in a manner that would interfere with the action of the dies.

The slide $q^2$ is connected to the bell-crank $t^2$, and carries a friction-roller, $u^2$, in its fork, against which the cam $v^2$ on the driving-shaft works to thrust the benders forward. The other arm of the bell-crank carries the friction-roller $w^2$, by which cam $w^3$ draws said benders back. The slide $s^2$, carrying the benders in the opposite range of dies, is connected to the rock-lever $x^2$ at the front of the machine, and connected by the rod $y^2$ with the forked rock-lever $z^2$, which is at the back of the machine, and has friction-roller $a^3$ in one arm of the fork, by which cam $b^3$ thrusts said slide forward, and also has friction-roller $c^3$ in the other arm of its fork, by which cam $d^3$ draws back said slide.

The benders $w$ and $x$ are bolted onto the slides, and the female benders $x$ are made with both ends suitably grooved for service as benders, and they are attached so that they may be reversed, and the slides have a tongued shoulder, $e^3$, fitting the grooved ends for support of the rear ends against the back-thrusts of service.

For the construction of the primary slitting-cutters $a$ $b$ and their duplicates $a'$ and $b'$ it is preferred to use three pieces each for the working and stationary dies, divided lengthwise of the stocks and in the planes of the cutting-edges, so that of said pieces, one being planed or milled lengthwise on both sides and the other two on one side, each in conformity with the lines $c$ $d$ $e$ of the cutting-edges, said edges will be formed thereby in a simple and inexpensive manner, and being placed one upon another in their beds may be held by clamps without other fastenings, because of the interlocking of the rib and groove form of the sides of the pieces, which results from the shape of the cutting-edges.

In the male die the two side pieces are made a little shorter than the middle piece, and in the female die the middle piece is made a little shorter for the proper projection of the cutting-edges. Besides the advantage of cheapness in construction, the parts may be regrooved, readjusted, and renewed separately.

For the construction of the parallel-edged barb-cutting dies, three pieces are used in like manner as in the primary slitting-dies, and the grooves constituting the female dies are formed by making channels in the side and the middle pieces the whole length of the same, which channels are filled with flat strips to a short distance from the cutting edges for packing back of said cutting-edges, and the oval-faced ribs of the male dies consist of projecting ends of other flat pieces packed in similar channels of the said side and middle pieces. (See Figs. 7 and 8.) By this contrivance the male and female barb-cutters and their duplicates of each range of dies are all mounted in one stock and secured by one clamp for simplicity and economy of construction; but, while thus arranged, it is desirable to be able to adjust the male dies independently of the female dies in the same stock. The flat strips of the said male dies are therefore extended a short distance back of the rear ends of the three clamping-pieces into the slits $f^3$ of a follower, $g^3$, placed behind the stock and bored coincident with said slits, so that the adjusting-screws $h^3$ will only affect said strips and dies, while another set-screw, $i^3$, acting directly against the follower, will shift the whole stock together when it is desired to adjust the female dies, which it is not so important to adjust separately.

The male bending-dies $w$ consist of projections of thin flat plates clamped in a stock of three parts, as represented in Fig. 9, which stocks are bolted to their respective slides, as the stocks of the female benders are; but they are not reversible.

In the connection of the slide $b^2$, which carries the range of working-cutters to the rods $h^2$, the bearing boxes $j^3$ and adjusting-wedges $k^3$ are introduced between the ends of the said rods and the bottoms of the forks, in which they are pivoted to relieve the connecting-pivots of the shocks of the dies, the shocks being in this case sustained by the ends of said rods and the bottoms of the forks and the pivots being only subject to the service of drawing the slide back. For presenting the strips to these dies the grooved guide rolls $l^3$ are employed, to introduce the strips to feed-rolls $m^3$, said guide-rolls consisting of two pairs arranged to carry the strips edgewise vertically, and each pair being mounted on a rocker, $n^3$, which rockers are provided with a spring device, $o^3$, and a lever, $p^3$, whereby they are shifted by turning the rockers on their pivots, so as to increase or diminish the vertical space between the rolls of each pair to grip or release the strips, and the spring device automatically holds the guide-roll to the edges of strips that may vary in width. The feed-rolls $m^3$, which are located between the guide-rolls and the dies, are set upright in suitable relation to the guides and said dies for forcing the strips along, the rolls being geared together by the toothed wheels $q^3$, and one has the ratchet-wheel $s^3$, as usual in such feeding-rolls, and it also has a friction-disk, $t^3$, and clamp-brake $u^3$ to prevent back-lash.

For working the pawl $w^3$ to operate the feed-rolls, a slide, $x^3$, is arranged in suitable ways, $y^3$, and connected to the driving-shaft $g^2$ by an eccentric, $z^3$, and rod $a^4$, to which slide the pawl lever $b^4$ is connected by the rod $c^4$ and adjustable block $d^4$, suitably for shifting the pawl forward or backward, as required, for adjusting the rolls. Besides these feed-rolls, there is also another pair, $e^4$, substantially the same except that they are grooved to pass the projecting barbs located on the delivery side of the machine, to be used in conjunction with them for taking effect on the barbed strips for more positively feeding the strips, and particularly for use when the rear ends of the strips have passed beyond the rolls $m^3$, which cannot feed them entirely through the machine. It is desirable to be able to separate these rolls $e^4$ at times, as for the starting of new strips between them, or in case a barb happens to get bent in a manner to obstruct the passage. For this purpose the journal-boxes $f^4$ of one roll are fitted in slideways $g^4$, and are connected by the toggle-links $h^4$ to the housings at $h^5$, and the links are connected to a working-rod, $i^5$, having a cam-lever, $j^5$, and a spring, $k^5$, by which said roll may be shifted back by turning down the lever and be closed up again by raising the lever. A friction-brake lever, $l^5$, is arranged to be readily pressed up against the face of balance-wheel $m^5$ by pressing the lever with the foot to stop the machine quickly when the driving-belt is thrown off.

Having thus described our invention, what we claim, and desire to secure by Letters Patent, is—

1. In the combination of barb cutting and bending dies comprising two ranges or series of cutting and bending dies, substantially as herein described, the benders having independent slides, and operating mechanism geared, as set forth, to close said benders on the strip in advance of and so as to gage the strips for the subsequent action of the rest of the said dies.

2. The combination of clamp-bars, clamp-levers, and clamp-screws, with the dies arranged in bed-grooves, substantially as described.

3. The duplicate primary slitting-cutters, consisting of three pieces having the joining surfaces in conformity and coincident with the cutting-edges, substantially as described.

4. The male and female barb-cutters, consisting of the channeled middle and side pieces, with packing-strips terminating short of the edges of the female cutters and projecting strips for the male cutters, substantially as described.

5. The female benders consisting of duplicate grooved-ended pieces reversibly secured to the slides, substantially as described.

6. The combination of the tongued backing-piece with the female benders, consisting of duplicate grooved-ended pieces reversibly secured to the slides, substantially as described.

7. The combination, with the barb-cutters, consisting of the channeled middle and side pieces and packing and projecting strips, of the follower having slits and holes for the projecting strips, independent adjusting-screws for said projecting strips, and an independent adjusting-screw for the follower, substantially as described.

8. The combination, with the cutter-slide and the connecting rods for working it, of thrust boxes and adjusting screws in the forks of the slide, substantially as described.

9. The combination of the cutter-slide and cutters thereon, connecting-rods, driving-shaft, the bender slide fitted in ways on the cutter-slide, bell-crank connected with the bender-slide, and the cam on the driving-shaft operating said bell-crank, substantially as described.

10. The combination of the slide and benders thereon in the stationary range of dies, rock lever, connecting-rod, forked lever, and cams on the driving-shaft working said slide, with the cutter-slide, independently-moving bender in the cutter-slide, connecting-rod, bell-crank, and the cam for working the bell-crank and bender-slide, substantially as described.

11. The combination, substantially as herein described, of two pairs of guide rolls, pivoted rocker-supports of the rolls, opening-lever, and closing-spring with the feed-roll and bending-dies.

12. The combination, substantially as herein described, of guide-rolls, feed-rolls, barbing cutters and benders, and the successive feeding and delivery rolls.

13. The combination, substantially as herein described, of guide-rolls, plain feed-rolls, barbing cutters and benders, and the successive grooved feeding and delivery rolls.

14. The combination, substantially as herein described, of the reciprocating slide, and the adjusting-block thereon, with the connecting-rod, pawl-lever, feed-pawl, and ratchet-wheel of the feed-rolls.

15. The combination of the toggle mechanism, opening-lever, and closing-spring with the feed-rolls having one of said rolls journaled in sliding boxes, substantially as described.

EDMUND JORDAN.
JOSEPH H. TEMPLIN.

Witnesses for Jordan:
  ROBERT I. HULL,
  WILLIAM D. PATTERSON.
Witnesses for Templin:
  W. J. MORGAN,
  S. H. MORGAN.